(12) United States Patent
Andres et al.

(10) Patent No.: US 10,831,280 B2
(45) Date of Patent: Nov. 10, 2020

(54) AUGMENTED REALITY SYSTEM FOR EFFICIENT AND INTUITIVE DOCUMENT CLASSIFICATION

(71) Applicant: INTERNATIONAL BUSINESS MACHINES CORPORATION, Armonk, NY (US)

(72) Inventors: Josh Andres, Melbourne (AU); Adam Eberbach, Melbourne (AU); Lenin Mehedy, Melbourne (AU); Yi Wei Ting, Singapore (SG)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 32 days.

(21) Appl. No.: 16/155,395

(22) Filed: Oct. 9, 2018

(65) Prior Publication Data

US 2020/0110468 A1    Apr. 9, 2020

(51) Int. Cl.
| | |
|---|---|
| *G06F 3/01* | (2006.01) |
| *G06F 3/0346* | (2013.01) |
| *G06F 3/0485* | (2013.01) |
| *G06F 3/0482* | (2013.01) |
| *G06K 9/00* | (2006.01) |
| *G06F 16/93* | (2019.01) |
| *G06F 16/28* | (2019.01) |
| *G06T 11/60* | (2006.01) |

(52) U.S. Cl.
CPC .............. *G06F 3/017* (2013.01); *G06F 3/012* (2013.01); *G06F 3/0346* (2013.01); *G06F 3/0482* (2013.01); *G06F 3/0485* (2013.01); *G06F 16/287* (2019.01); *G06F 16/93* (2019.01); *G06K 9/00456* (2013.01); *G06T 11/60* (2013.01); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 8,947,456 B2 | 2/2015 | Chen et al. | |
| 9,256,283 B2 | 2/2016 | Kang | |
| 2009/0322671 A1 | 12/2009 | Scott et al. | |
| 2012/0038550 A1* | 2/2012 | Lemmey | A63F 13/42 345/156 |
| 2014/0248950 A1* | 9/2014 | Tosas Bautista | G06F 3/01 463/31 |

(Continued)

FOREIGN PATENT DOCUMENTS

| | | |
|---|---|---|
| WO | WO2013/141862 | 9/2013 |
| WO | WO2014/150430 | 9/2014 |

*Primary Examiner* — Afroza Chowdhury
(74) *Attorney, Agent, or Firm* — F. Chau & Associates, LLC (57) ABSTRACT

A computer-implemented method of using augmented reality (AR) to classify documents includes displaying one or more visual representations of one or more actions of a mobile device application in an AR display of a mobile device, selecting, by the mobile device, one of the one or more visual representations of one of the one or more actions for a document associated with the mobile device application in response to the mobile device being gestured toward the one visual representation of the one action, and classifying the document by performing the selected one action on the document.

18 Claims, 6 Drawing Sheets

(56) References Cited

U.S. PATENT DOCUMENTS

| | | | |
|---|---|---|---|
| 2015/0169076 A1* | 6/2015 | Cohen | G06F 3/04815 |
| | | | 345/156 |
| 2016/0026253 A1 | 1/2016 | Bradski et al. | |
| 2017/0262064 A1* | 9/2017 | Ofir | G06F 3/017 |
| 2018/0104573 A1* | 4/2018 | Jeffery | G06F 3/041 |
| 2018/0157333 A1* | 6/2018 | Ross | G06F 21/6245 |

* cited by examiner

AUGMENTED REALITY SYSTEM FOR EFFICIENT AND INTUITIVE DOCUMENT CLASSIFICATION

TECHNICAL FIELD

Embodiments of the present disclosure are directed to methods and systems for augmented reality (AR).

DISCUSSION OF THE RELATED ART

Augmented reality (AR) is a live view of a physical, real-world environment that is merged with computer-generated images across multiple sensory modalities. The overlaid sensory information can add to the natural environment or mask the natural environment, and is spatially registered with the physical world such that a user perceives herself as being immersed in the real environment. Unlike virtual reality, which replaces the real world environment with a simulated environment, augmented reality alters one's current perception of a real world environment.

Users of devices such as smartphones or tablets are able to receive and send documents such as email, text messages, contact records, etc., with ease, resulting in many items that need to be viewed and classified. Using the very limited screen space of small devices, users may seek to classify these documents for future reference, such as trash, pending, family, urgent etc. When more than a few categories are possible, which may necessitate the use of menus or pick lists to choose a category, this process can be very slow. Furthermore, users of smartphones and tablet need to click/tap multiple menus due to the small screen size when organizing contents, such as email, photos, etc. This can be inconvenient and inefficient for healthy users when completing batch operations or one hand situations as well as limiting for users who require accessibility assistance.

SUMMARY

Exemplary embodiments of the present disclosure are directed to systems and methods that can generate a series of virtual containers in augmented reality that are representative of the most common actions to be taken on the contents of a mobile device screen. The user can gesture with the device itself, similar to dealing cards, to match an on-screen item to an action-container. Systems according to embodiments of the disclosure can provide an improved user experience across mobile and tablet devices for repetitive tasks, Its According to an embodiment of the disclosure, there is provided a computer-implemented method of using augmented reality (AR) to classify documents that includes displaying one or more visual representations of one or more actions of a mobile device application in an AR display of a mobile device, selecting, by the mobile device, one of the one or more visual representations of one of the one or more actions for a document associated with the mobile device application in response to the mobile device being gestured toward the one visual representation of the one action, and classifying the document by performing the selected one action on the document.

According to a further embodiment of the disclosure, selecting, by the mobile device, one of the one or more visual representations of one of the one or more actions for a document associated with the mobile device application comprises using a gyroscope and an accelerometer associated with the mobile device to match the gesture with the one visual representation of the one action.

According to a further embodiment of the disclosure, the AR display is one of a head mounted display or a smart glass on the mobile device.

According to a further embodiment of the disclosure, the method includes determining the one or more actions of the mobile device application, and contextually labeling the one or more visual representations of the one or more actions based on their contents. The contents of a visual representation of an action include those documents classified by the action associated with the visual representation.

According to a further embodiment of the disclosure, determining the one or more actions of the mobile device application includes presenting a plurality of AR objects in the AR display, presenting a list of the one or more actions of the mobile device application in the AR display, scrolling through the list of one or more actions, where an action in the list of one or more actions is highlighted in response to the mobile device being gestured toward the action, and associating the highlighted action in the list of one or more actions with one of the plurality of AR objects, in response to the mobile device being gestured from the highlighted action to the one AR object. The one AR object becomes the visual representation of the highlighted action.

According to a further embodiment of the disclosure, determining the one or more actions of the mobile device application further comprises determining, by the mobile device, a predetermined number of most used actions of the mobile device application, and associating, by the mobile device, each of the most used actions with one of a plurality of AR objects that are visible in the AR display, wherein the plurality of AR objects become the visual representations of the most used actions.

According to another embodiment of the disclosure, there is provided a system for using augmented reality (AR) to classify documents that includes an AR display device, and a mobile computer system operatively coupled to the AR display device that includes at least one processor tangibly embodying a program of instructions executed by the mobile computer system to cause the mobile computer system to perform a method. The method includes receiving a document associated with a mobile computer system application, selecting, by the mobile computer system, one of one or more visual representations of one of one or more actions of the mobile computer system application for the received document, in response to the mobile computer system being gestured toward the visual representations of the one action, and classifying the received document by performing the selected one action on the document, According to another embodiment of the disclosure, there is provided a computer program product for using augmented reality (AR) to classify documents, comprising a non-transitory program storage device readable by a mobile computer, tangibly embodying a program of instructions executed by the mobile computer to cause the mobile computer to perform a method. The method includes selecting, by the mobile computer, one of one or more actions of a mobile computer application for a document associated with the mobile computer application in response to the mobile device being gestured toward one of one or more visual representations of the one action, wherein the mobile computer uses a gyroscope and an accelerometer to match the gesture with the one visual representation of the one action, and classifying the document by performing the selected one action on the one document.

DETAILED DESCRIPTION OF EXEMPLARY EMBODIMENTS

Exemplary embodiments of the disclosure as described herein generally provide augmented reality systems and methods for efficient and intuitive document classification. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the present disclosure are directed to the generation of a series of virtual containers or categories, such as file folders, buckets, etc., that are generated by a mobile device and are displayed using augmented reality. These containers may be labeled with text or images. For a case of sorting images to identify visible faces or other features for training recognition, the containers can be labeled with pictures. When a user desires to categorize a document or a series of documents, they can select an augmented reality container by moving the mobile device, making use of an integrated accelerometer to detect motion so that the augmented reality container or label is visible in the device's display, and perform the categorization by simply tapping on the container in the same way as they might tap a label on a screen. In this way, the various labels are all available without switching the user interface, as the labels are being displayed as part of a virtual world that appears in combination with or behind a regular user interface. If AR glasses are available, the device can generate AR images in the user's field of view, which provides the user with a wider field so that the user can see all containers or labels at one time. The user could then categorize items by flicking the device toward the virtual container in the manner of someone dealing cards.

Augmented reality (AR) provides an extra dimension to users of systems such as smartphones that are capable of supporting it. To generate an object in AR, a device generates an image which is then merged with an image received from a camera. The illusion of reality is enhanced by having these AR objects appear to have a location in the real world that is independent of the motion of the camera. Often, an AR object is portrayed as stationary so that as the device changes orientation and the displayed image reflects the change, the AR object appears to be fixed to a location in the same way that a physical object remains fixed to a location.

A system that performs categorization has a number of known discrete categories in many systems, a user can add a new category, and that category is then added to the list of discrete categories. Once these categories are known the AR system can create suitable images to represent them. These images may range from generic representations that represent folders, boxes, or other collecting objects, to more creatively labeled objects, such as pictures of places, activities, people or any other representation the user may find suggestive of the category. AR objects can be located in virtual space at any location convenient to the user and can be repositioned by the user. According to an embodiment, an AR container is an AR object that visually represents a classification or category of a document, which may be associated with an action to be performed on the document.

When a user views a document on a mobile device, the user can orient the device such that various AR containers are loaded in the virtual environment in relation to the actions possible to conduct with the document being viewed. The user then can flick the document from the mobile device to one of the AR containers to perform an action associated with the document. Documents can be notifications, so as the user receives a notification, the user can flick the wrist and the notification goes into a container. When the user opens a photo or music app, the contents of the app, such as photos and music files, are documents.

If a user is wearing, a headset capable of superimposing AR objects in the field of view, the user has a spatial location in relation to the superimposed objects and can gesture toward those objects. Upon displaying a document or record, the user can gesture toward the AR object to make the assignment, as if flicking something from the device toward the object. This gesture invokes the assignment by detecting the flick gesture using the device accelerometer, and determines the selected object using positioning sensors located in the headset, a standard part of an AR headset. The device is assumed to be co-located with the headset and so the gesture toward the object is easily assigned to that object. The device can then make the assignment. These assignments are made in the same way as if a user had, when a document was selected, opened a menu and selected a category or class, or assigned an attribute to the document.

Different gestures can be used to manipulate documents, similarly to viewing images on a device. For example, double tap or tap zooms in, and with two fingers you can zoom in and out, so I imagine that holding the device with one hand, and using a gesture will enable the containers to appear and then a flick of the wrist will cause the document being viewed to be put into the container. The gestures can be system defined, app defined, or user-defined. The document being flicked can be represented as flying through the air as an animation, like a shooting star flying from the mobile device to the container, and then the container shows the document is now inside it, such as with a number counter, or a check mark to show that it is received.

An AR system according to an embodiment can automatically know what actions a user is performing. When a user moves a mobile device, for example like flicking a card, the device's coordinates are captured with the device's gyroscope and accelerometer, which can exactly pinpoint the user gesture, and direction. These coordinates are leveraged by the AR system and interpreted in the context of the app. For example, the file on the screen of mobile device combined with the gesture coordinates means to place this file in this container on the left which is labeled "important".

Figure 1:
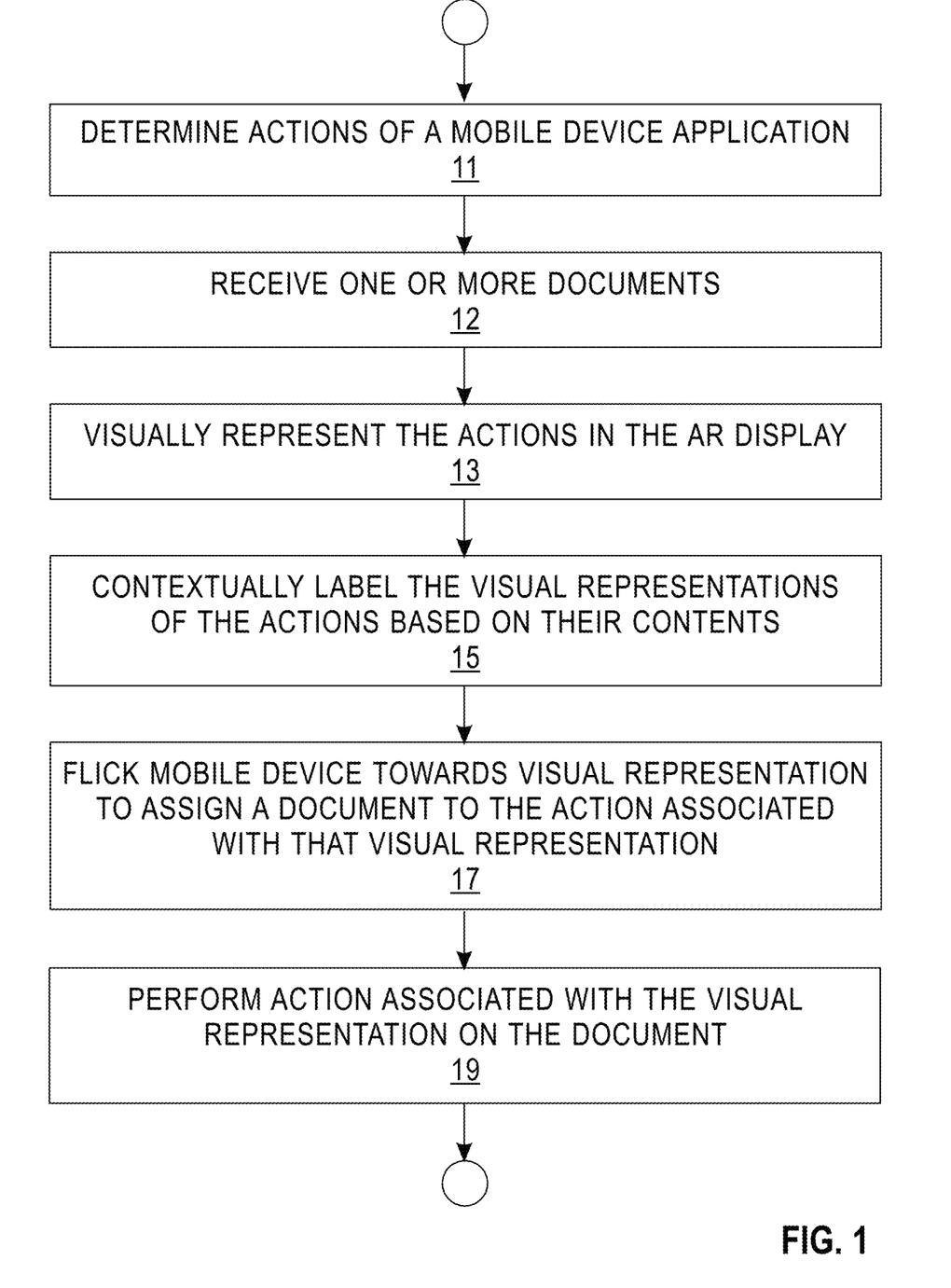
FIG. 1 is a flowchart of a method of using AR to classify documents, according to an embodiment of the disclosure.

FIG. 1 is a flowchart of a method of using AR to classify documents, according to an embodiment of the disclosure. At step 11, a user or AR system determines the most popular or most used classifications or actions associated with a mobile device application. There are various possibilities here for the user or AR system to determines the most popular actions on a mobile device. For some applications, such as an email app, some of the most popular actions are delete and important, thus containers for these actions may already exist, ready for the user to start flicking email is into them without any need for a set up. In another example according to an embodiment, a user is provided with a plurality of containers at a start up, and the user can choose what the action is associated with each container. The user can do so by selecting from possible actions offered by the app. For an email app, the actions may include delete, archive, read later, spam, important, etc. The user points the mobile device in the direction of a new bucket, and by moving gently flicking left or right, the user will scroll through the possible is actions. Once the user is satisfied with the actions, another gesture may be used for confirmation, after which the containers are ready for use.

At step 12, the user receives one or more documents. The document may be a notification, such as that for an incoming email, or a list of documents may be displayed on opening an app, with one document being highlighted.

Figure 7:
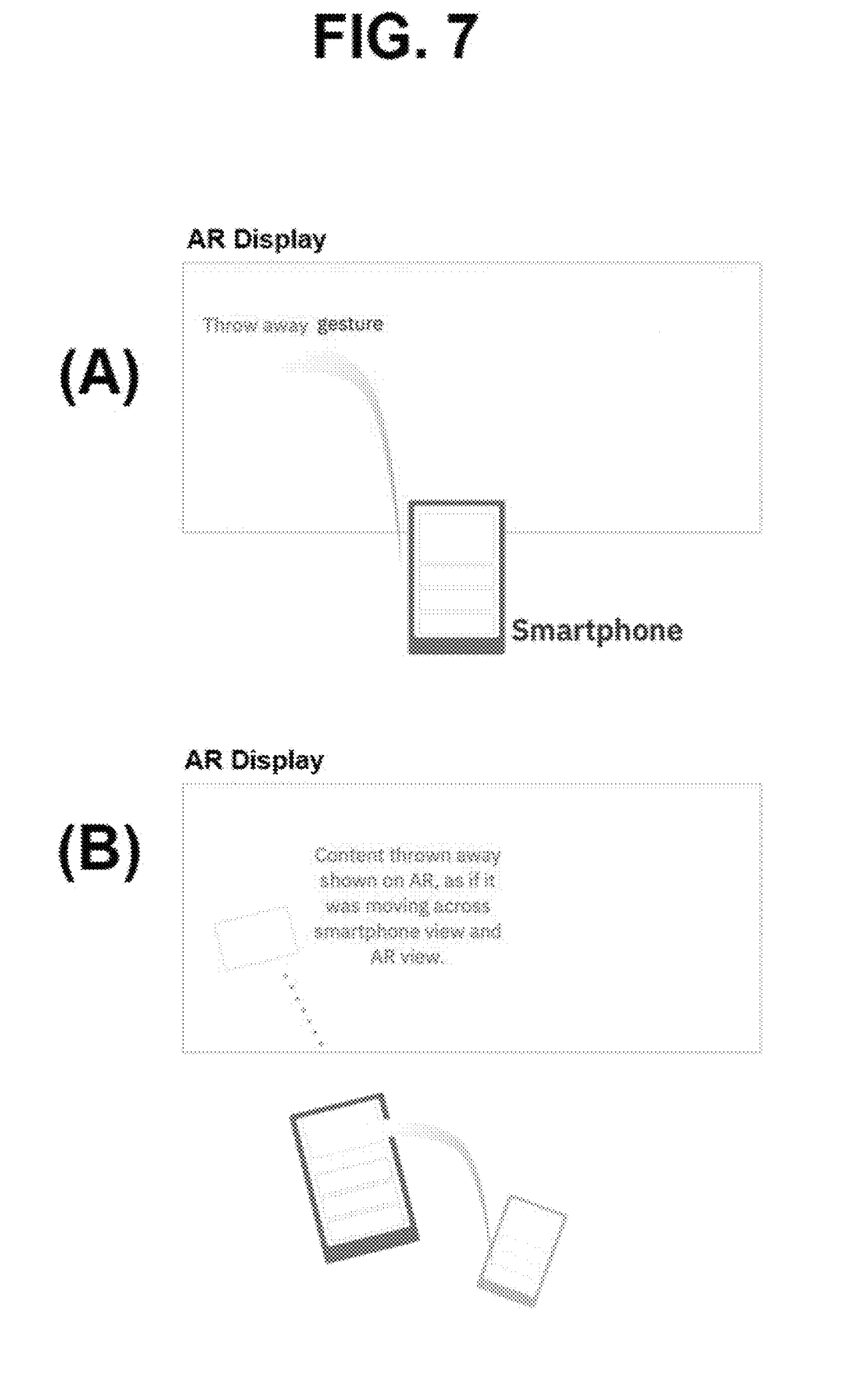
FIGS. 7A-B illustrate one of the one or more visual representations of one of the one or more actions for a document associated with the mobile device application being selected in response to the mobile device being gestured toward the one visual representation of the one action, according to an embodiment of the disclosure.

At step 13, the actions are visually represented by AR objects. An exemplary, non-limiting AR object is a container or bucket. The user may be using a head mounted display, or have access to a smart glass to view and place the containers. An AR system according to an embodiment can automatically add labels to the containers, based on the actions of an application. For example, if the app is email, the labels would be delete, prioritize, assign label, mark as unread, archive, delete, tag as important, etc. In another example, the containers can be automatically labeled with the most popular actions performed by the user for the app, so if the user never uses the 'mark as unread' action, this action will not appear, and if a user uses 'archive' instead of deleting, then 'archive' will be a label on the containers. In another embodiment, the labels are displayed to the user, and the user selects which labels to use. FIG. 7A is a visual representation of an action associated with the contents shown by a mobile device application where the action is a throw away gesture.

Figure 2:
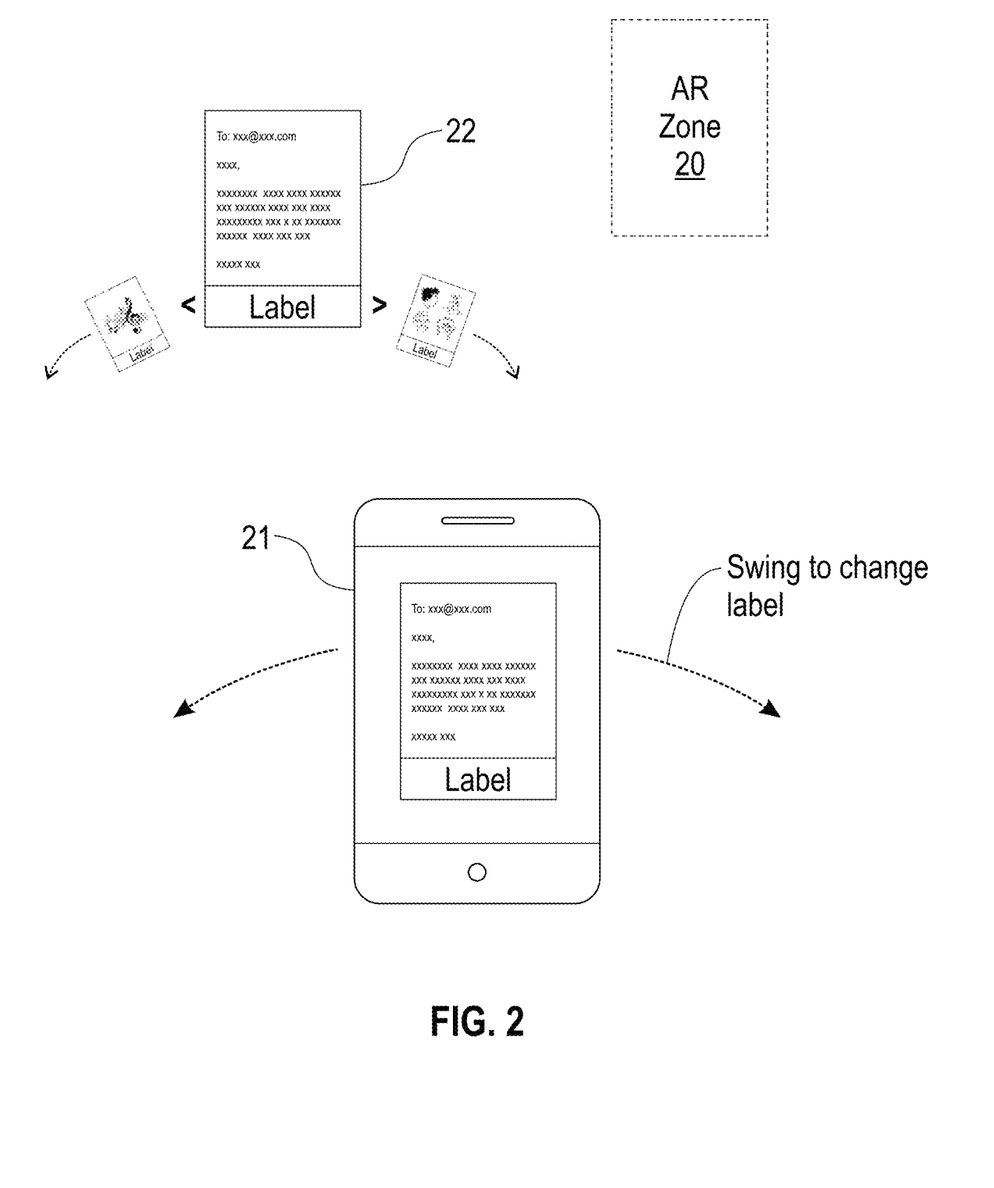
FIG. 2 illustrates a user flicking a phone to either side to scroll through possible labels, according to an embodiment of the disclosure.
Figure 3:
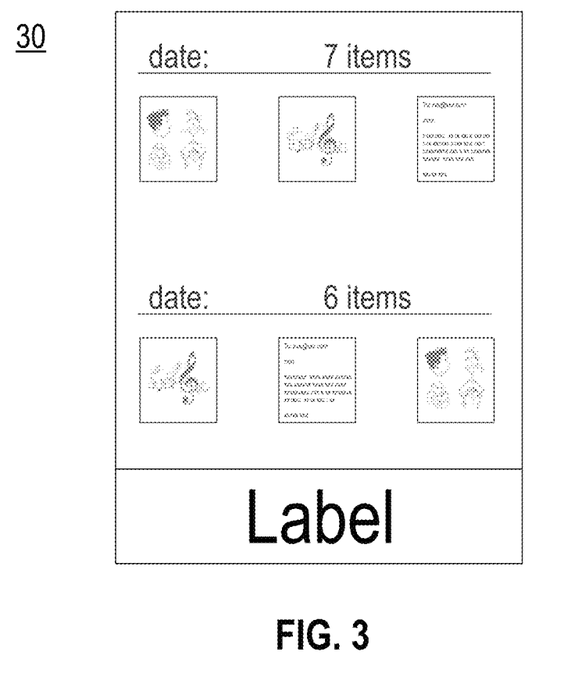
FIG. 3 shows that containers would appear to the user as semi-transparent areas, according to an embodiment of the disclosure.
Figure 4:
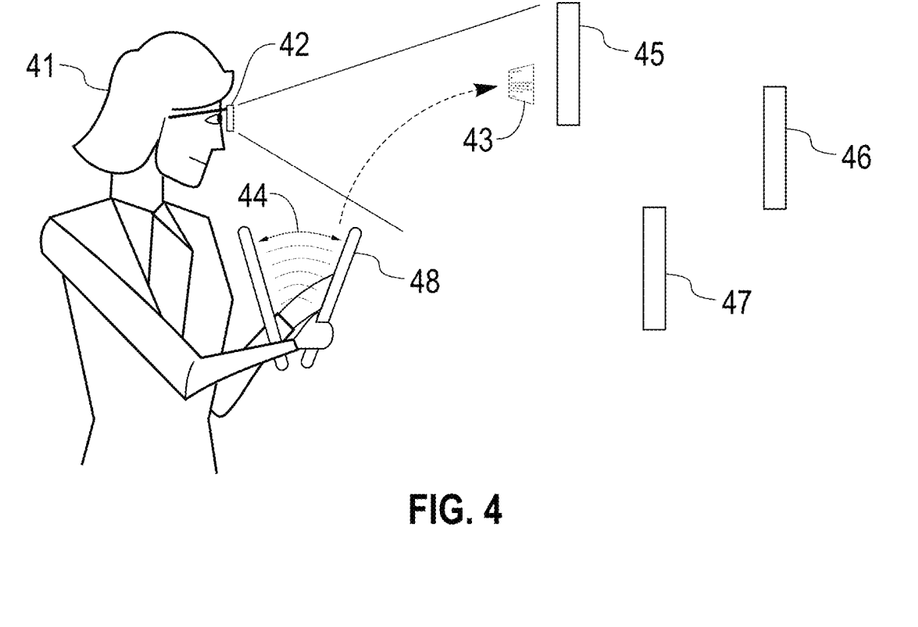
FIG. 4 illustrates what a user would see as the user gestures the device toward a container, according to an embodiment of the disclosure.

Referring now to FIG. 2, a user can flick a phone 21 to either side to scroll through possible labels 22 for the actions of an app that are displayed in the AR zone 20 visible in an AR display, regardless of which of the above approaches is used to show the labels. Referring to FIG. 3, the containers would appear to the user as semi-transparent areas 30. At step 15, the containers are contextually labeled based on their contents. For example, for an email application, the contents of each container would be those emails classified according to the container's associated action. The labeling can be performed by the user or the AR system. At step 19, gesture based sorting according to an embodiment is performed that uses the user's gesture and the device's gyroscope/accelerometer to align the user's device to the containers. The mobile device is flicked towards an AR container to assign a document to that container, and the gyroscope and accelerometer coordinates are used to match the gesture towards the container in AR. An AR system according to an embodiment provides a visual feedback mechanism to the user. FIG. 7B shows content being thrown away in the AR display, as if it is moving across the smartphone view and the AR display. The trajectory of the throwaway gesture is calculated by the gyroscope and accelerometer. FIG. 4 illustrates what a user 41 would see as he/she is gesturing 44 the device 48 toward a container. In one embodiment, a user 41 wearing an AR headset or smart glasses 42 sees a document 43 flying from the mobile phone to one of several containers 45, 46, 47, while in another embodiment, rather than seeing an document flying to the container, the container changes appearance to indicate that something was added. For example, a colored check could appear in the container, or the container itself could change color. Referring again to FIG. 3 again, the user would also see the date each document was added to the container, the number of documents, and the label, were the documents could include files, emails, songs, pictures, etc. The matching results in an action being performed on the document at step 19 to classify the document, such as archiving an email, deleting an email, tagging an email as important.

According to embodiments, various different types of gestures can be used, and gestures can be used for various purposes. For example, an AR system could show on the device's display a graphic to educate the user on how to use gestures. In other embodiments, some apps may have specific gestures. For example, some AR based games would use, instead of flicking, a gesture more like an over the head throw, which is as the coordinates can be leveraged.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
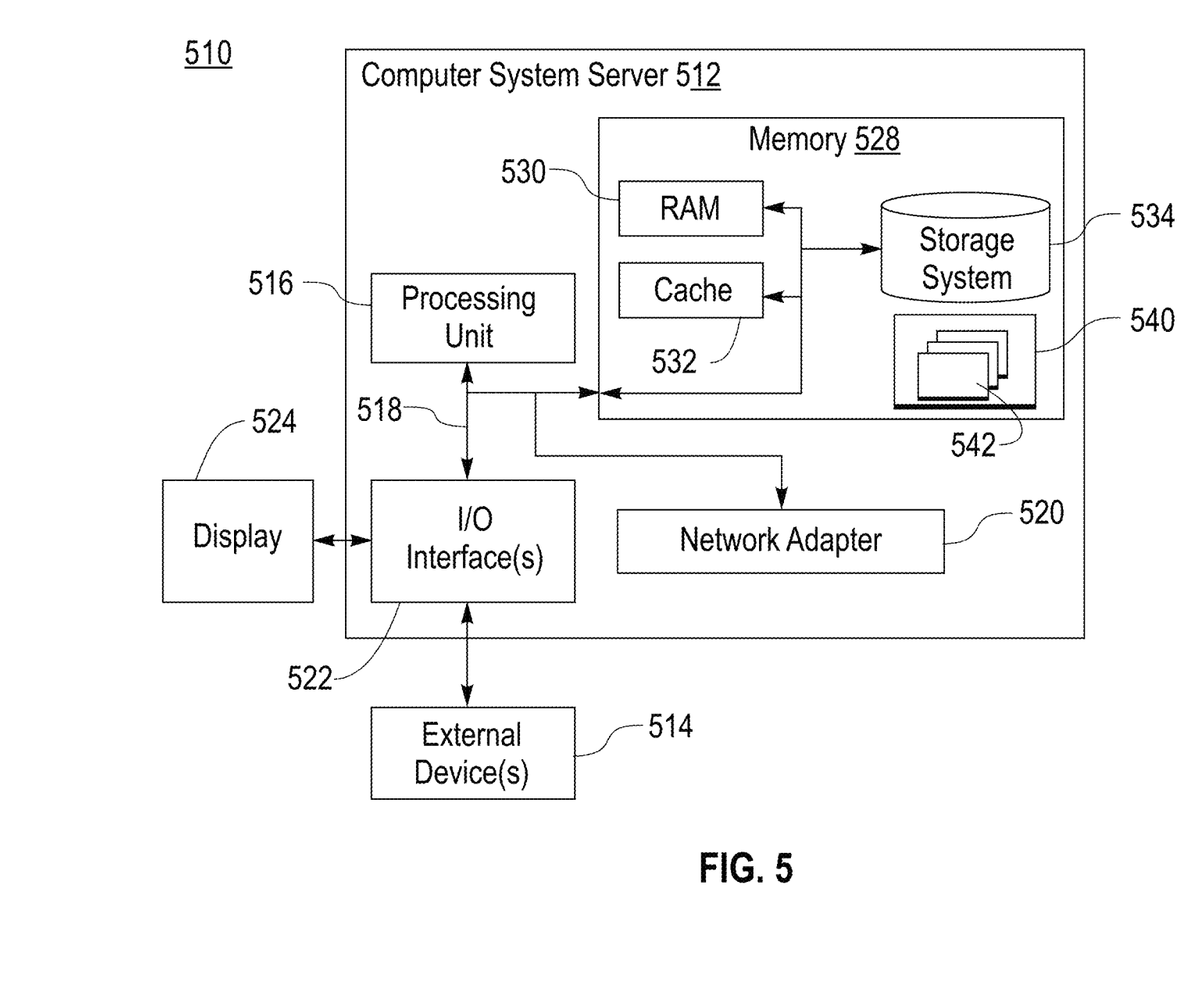
FIG. 5 is a schematic of an exemplary cloud computing node that implements an embodiment of the disclosure.

Referring now to FIG. 5, a schematic of an example of a cloud computing node is shown. Cloud computing node 510 is only one example of a suitable cloud computing node and is not intended to suggest any limitation as to the scope of use or functionality of embodiments of the disclosure described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided, in such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the disclosure as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
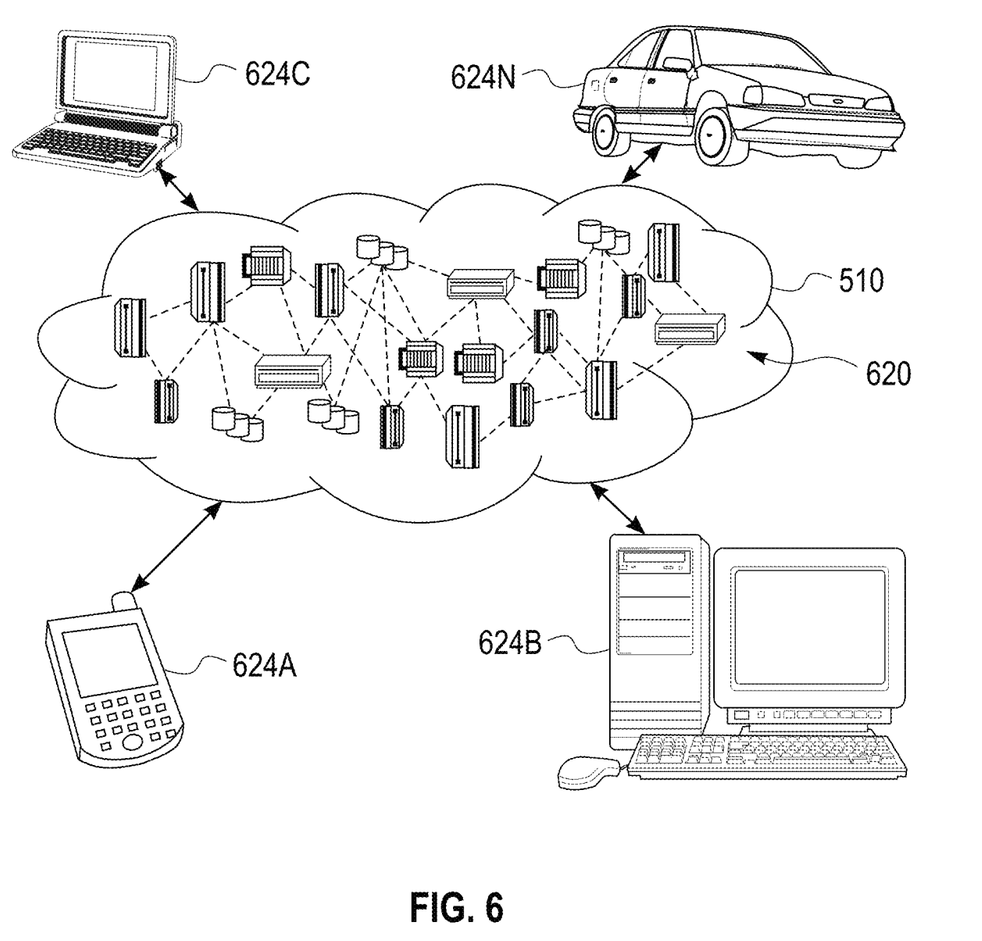
FIG. 6 shows an exemplary cloud computing environment according to embodiments of the disclosure.

Referring now to FIG. 6, illustrative cloud computing environment 620 is depicted. As shown, cloud computing environment 620 comprises one or more cloud computing nodes 510 with which local computing devices used by cloud consumers, such as, for example, personal digital assistant (PDA) or cellular telephone 624A, desktop computer 624B, laptop computer 624C, and/or automobile computer system 624N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 620 to offer infrastructure, platforms and/or software as services for which a cloud consumer does not need to maintain resources on a local computing device. It is understood that the types of computing devices 624A-N shown in FIG. 6 are intended to be illustrative only and that computing nodes 510 and cloud computing environment 620 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method of using augmented reality (AR) to classify documents, comprising the steps of:
    displaying one or more visual representations of one or more actions of a mobile device application in an AR display of a mobile device;
    gesturing, by a user, the mobile device toward one of the one or more visual representations of one of the one or more actions for a document associated with the mobile device application;
    selecting by the mobile device, the one action in response to the mobile device being gestured toward the one visual representation of the one action; and
    classifying the document by performing the selected one action on the document.

2. The method of claim 1, wherein selecting, by the mobile device, one of the one or more visual representations of one of the one or more actions for a document associated with the mobile device application comprises
    using a gyroscope and an accelerometer associated with the mobile device to match the gesture of the mobile device being gestured with the one visual representation of the one action.

3. The method of claim 1, wherein the AR display is one of a head mounted display or a smart glass on the mobile device.

4. The method of claim 1, farther comprising:
    determining the one or more actions of the mobile device application; and
    contextually labeling the one or more visual representations of the one or more actions based on their contents, wherein the contents of a visual representation of an action include those documents classified by the action associated with the visual representation.

5. The method of claim 4, wherein determining the one or more actions of the mobile device application further comprises
    presenting a plurality of AR objects in the AR display,
    presenting a list of the one or more actions of the mobile device application in the AR display,
    gesturing, by the user, the mobile device toward an action visible in the AR display;
    scrolling through the list of one or more actions wherein the action in the list of one or more actions is selected in response to the mobile device being gestured toward the action; and
    associating the selected in the list of one or more actions with one of the plurality of AR objects, in response to the mobile device being gestured from the selected action to the one AR object, wherein the one AR object becomes the visual representation of the selected action.

6. The method of claim 4, wherein determining the one or more actions of the mobile device application further comprises determining, by the mobile device, a predetermined number of most used actions of the mobile device application, and associating, by the mobile device, each of the most used actions with one of a plurality of AR objects that are visible in the AR display, wherein the plurality of AR objects become the visual representations of the most used actions.

7. A system for using augmented reality (AR) to classify documents, comprising:

an AR display device; and a mobile computer system operatively coupled to the AR display device that includes at least one processor tangibly embodying a program of instructions executed by the mobile computer system to cause the mobile computer system to perform a method comprising the steps of:

receiving a document associated with a mobile computer system application;

gesturing, by a user, the mobile computer system toward one of one or more visual representations of one of one or more actions of the mobile compute system application for the received document;

selecting by the mobile computer system, the one action in response to the mobile computer system being gestured toward the visual representations of the one action; and classifying the received document by performing the selected one action on the document.

8. The system of claim 7, wherein selecting, by the mobile computer system, one of one or more visual representations of one of one or more actions of the mobile computer system application for the received document comprises using a gyroscope and an accelerometer associated with the mobile computer system being gestured to match the gesture with the one visual representation of the one action.

9. The system of claim 7, wherein the AR display device is one of a head mounted display or a smart glass on the mobile computer system.

10. The system of claim 7, wherein the method further comprises:

determining the one or more actions of the mobile computer system application;

displaying the one or more visual representations of the one or more actions of the mobile computer system application in the AR display device of the mobile computer system; and contextually labeling the one or more visual representations of the one or more actions based on their contents, wherein the contents of a visual representation of an action include those documents classified by the action associated with the visual representation.

11. The system of claim 10, wherein determining the one or more actions of the mobile computer system application further comprises presenting a plurality of AR objects in the AR display device, presenting a list of the one or more actions of the mobile computer system application in the AR display device, gesturing, by the user, the mobile device toward an action visible in the AR display;

scrolling through the list of one or more actions wherein the action in the list of one or more actions is selected in response to the mobile computer system being gestured toward the action; and associating the selected action in the list of one or more actions with one of the plurality of AR objects, in response to the mobile computer system being gestured from the selected action to the one AR object, wherein the one AR object becomes the visual representation of the selected action.

12. The system of claim 10 wherein determining the one or more actions of the mobile computer system application further comprises determining, by the mobile computer system, a predetermined number of most used actions of the mobile computer system application, and associating, by the mobile computer system, each of the most used actions with one of a plurality of AR objects that are visible in the AR display device, wherein the plurality of AR objects become the visual representations of the most used actions.

13. A computer program product for using augmented reality (AR) to classify documents, comprising a non-transitory program storage device readable by a mobile computer, tangibly embodying a program of instructions executed by the mobile computer to cause the mobile computer to perform a method comprising the steps of:

gesturing, by a user, the mobile computer toward one of the one or more visual representations of one of the one or more actions of a mobile computer application for a document associated with the mobile device application;

selecting, by the mobile computer, the one action in response to the mobile device being gestured toward one of one or more visual representations of the one action, wherein the mobile computer uses a gyroscope and an accelerometer associated with the mobile device being gestured to match the gesture with the one visual representation of the one action; and classifying the document by performing the selected one action on the one document.

14. The computer program product of claim 13, wherein the method further comprises displaying the one or more visual representations of the one or more actions of the mobile computer application in an AR display of the mobile computer.

15. The computer program product of claim 14 wherein the AR display is one of a head mounted display or a smart glass on the mobile computer.

16. The computer program product of claim 13, wherein the method further comprises:

determining the one or more actions of the mobile computer application; and contextually labeling the one or more visual representations of the one or more actions based on their contents, wherein the contents of a visual representation of an action include those documents classified by the action associated with the visual representation.

17. The computer program product of claim 16, wherein determining the one or more actions of the mobile computer application further comprises presenting a plurality of AR objects in the AR display, presenting a list of the one or more actions of the mobile computer application in the AR display, gesturing, by the user, the mobile device toward an action visible in the AR display;

scrolling through the list of one or more actions wherein the action in the list of one or more actions is selected in response to the mobile computer being gestured toward the action; and associating the selected action in the list of one or more actions with one of the plurality of AR objects, in response to the mobile computer being gestured from the selected action to the one AR object, wherein the one AR object becomes the visual representation of the selected action.

18. The computer program product of claim 16, wherein determining the one or more actions of the mobile computer application further comprises determining, by the mobile computer, a predetermined number of most used actions of the mobile computer application, and associating, by the mobile computer, each of the most used actions with one of a plurality of AR objects that are visible in the AR display, wherein the plurality of AR objects become the visual representations of the most used actions.

\* \* \* \* \*

UNITED STATES PATENT AND TRADEMARK OFFICE
CERTIFICATE OF CORRECTION

PATENT NO. : 10,831,280 B2  
APPLICATION NO. : 16/155395  
DATED : November 10, 2020  
INVENTOR(S) : Andres et al.

Page 1 of 1

It is certified that error appears in the above-identified patent and that said Letters Patent is hereby corrected as shown below:

On the Title Page

Under item (12), delete "Andres et al." and insert --Moros Ortiz--.

Item (72), Line 1, The name of inventor Josh Andres should read Jorge Andros Moros Ortiz.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*